Aug. 19, 1924.
G. W. ROLLINS
AXLE PACKING
Filed Aug. 16, 1917
1,505,431
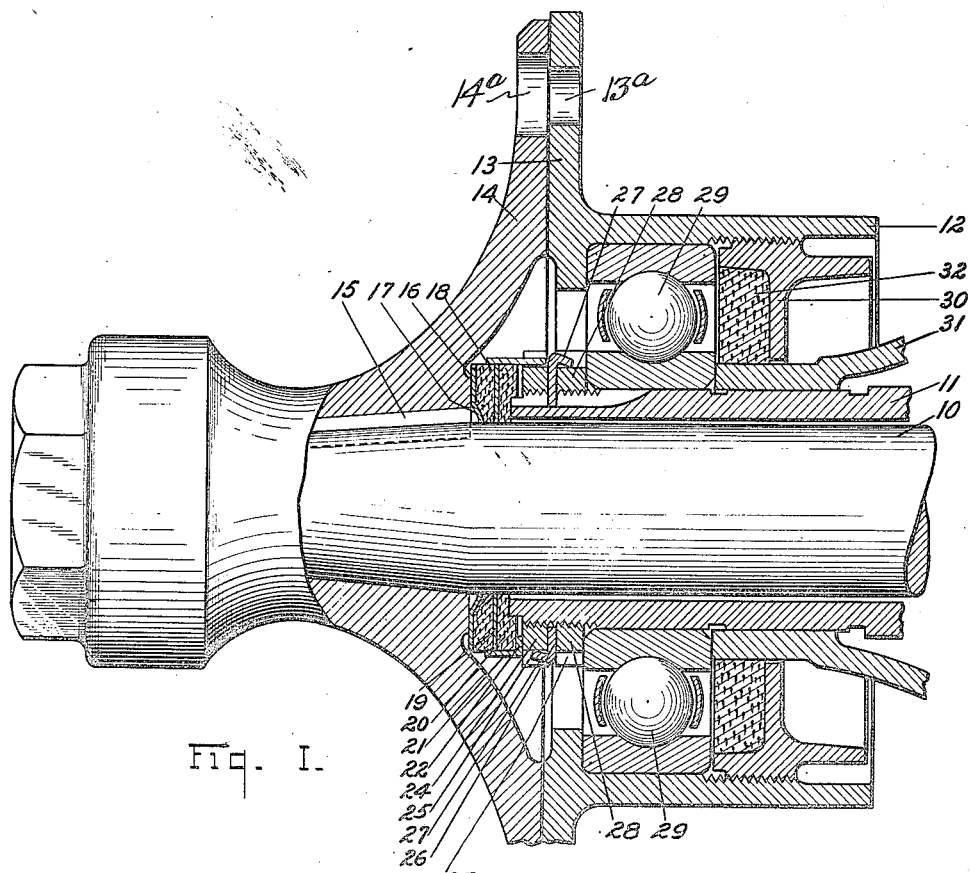
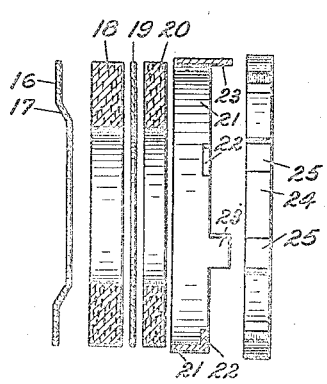
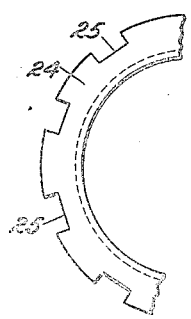
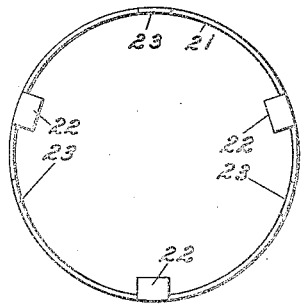
Inventor
Grant W. Rollins
By Chester H. Braselton
Attorney Patented Aug. 19, 1924.

1,505,431

UNITED STATES PATENT OFFICE.

GRANT W. ROLLINS, OF TOLEDO, OHIO, ASSIGNOR TO THE WILLYS-OVERLAND COMPANY, OF TOLEDO, OHIO, A CORPORATION OF OHIO.

AXLE PACKING.

Application filed August 16, 1917. Serial No. 186,535.

*To all whom it may concern:*

Be it known that I, GRANT W. ROLLINS, a citizen of the United States, residing at Toledo, in the county of Lucas and State of Ohio, have invented certain new and useful Improvements in Axle Packings, of which I declare the following specification to be a full, clear, and exact description.

This invention relates to an improved axle packing.

The principal object of this invention is to provide an improved arrangement for the axle packing in the live axle of a motor vehicle which will lengthen the life of the packing and prevent its wearing unduly.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a part longitudinal, sectional view through the end of a live axle embodying my invention.

Figure II is a sectional view through the elements going to make up my improved arrangement of axle packing, the elements being shown separated in order to make their construction more clear.

Figure III is a fragmentary, top plan view of the lock nut secured to the end of the axle casing, and Figure IV is a plan view of the retaining ring carried by the lock nut on the axle casing and which carries the packing elements.

In the drawings, similar reference numerals refer to similar parts throughout the several views.

Considering the numbered parts of the drawing, I have shown a stationary axle casing 11 in which the axle shaft 10 is rotatably mounted. The hub 14 is keyed to the outer end of shaft 10 by means of a spline 15 and the hub box 12 having a spoke flange 13 is secured to the flange of the hub 14 by means of bolts (not shown), the holes for one of which are shown in the flanges 13 and 14 at 13ª and 14ª respectively. The lock nuts 24 and 28 are threaded on to the end of the axle casing 11 and are provided with notches 25 in the periphery thereof, a lock washer 26 being disposed between the nuts 24 and 28 and provided with the tongues 27 which are bent alternately in opposite directions so as to engage in the notches 25 in said nuts 24 and 28 to prevent the rotation of said nuts relative to each other.

A retaining ring 21 is provided, having tongues 23, which are disposed in certain of the notches 25 formed in the nut 24. The retaining ring 21 is also provided with radially extending tongues 22 as clearly shown in Figure IV of the drawing.

This retaining ring 21 carries the packing elements which comprise the inner packing ring 20 and the outer packing ring 18 with the washer 19 disposed between the two rings. A washer 16 is provided which abuts the inner surface of the hub 14 and is provided with an inwardly bent flange 17 as is clearly shown in Figure II of the drawing. The bearing 29 is disposed between the hub box 12 and the axle casing 11 and retained in place by the stationary sleeve 31 of the brake hub. The ring 30 is screwed into the interior of the hub box 12 and secures in place the packing 32 in the usual manner.

From the description of the parts given above, the operation of my device should be very readily understood. It is customary to provide a packing ring which is disposed around the shaft and between the inner surface of the hub 14 and the end of the axle casing 11. Where such a packing ring is provided, due to the fact that the hub rotates relatively to the axle casing, the side of the packing ring will become worn due to the friction caused by its rubbing against adjacent surfaces. As I have already pointed out, the principal object of my invention is to provide an arrangement of the packing, such that this wear on the side surfaces is practically obviated so as to greatly lengthen the life of the packing ring. This is accomplished by the arrangement which I have shown in the drawing and described in the specifications. The outer packing ring 18, which abuts the washer 16, turns with the hub 14 while the inner packing ring 20, which is carried within the retaining ring 21, is held stationary because the retaining ring 21 is connected to the axle casing. The packing rings 18 and 20 therefore turn relatively to each other and the washer 19 which is disposed between these packing rings forms a smooth bearing surface against which the sides of the packing rings 18 and 20 are disposed so that the wear of the packing rings is obviated to a great extent.

Having thus described my invention, what I claim as new and desire to secure by Letters Patent is:

1. A device of the class described, comprising the combination of an axle casing; a shaft rotatable therein; a hub secured to said shaft; a packing ring on said shaft adapted to be held against displacement by said hub; a second packing ring on said shaft carried by said casing; and a washer disposed between the adjacent surfaces of said packing rings.

2. A device of the class described, comprising the combination of an axle casing; a shaft rotatable therein; a hub secured to said shaft; a washer on said shaft adjacent the inner surface of said hub, a packing ring adjacent to said washer; a retaining ring carried by the axle casing; a second packing ring on said shaft carried by said retaining ring; and a washer disposed between said packing rings.

3. A device of the class described, comprising the combination of an axle casing; a shaft rotatable therein; a hub secured to said shaft; a retaining ring carried by the end of said axle casing; a pair of packing rings held in position on said shaft within said retaining ring; and a washer carried by said ring and disposed between said packing rings.

4. A device of the class described comprising the combination of a casing, a shaft rotatable therein, a hub secured to said shaft, packing interposed between said hub and casing and a retaining ring for said packing having a series of lateral projections supported by said casing.

5. A device of the class described comprising the combination of a casing, a shaft rotatable thereon, a hub secured to said shaft, packing interposed between said hub and casing and a retaining ring for said packing having inwardly extending radial lugs upon which the packing is adapted to rest and laterally projecting lugs extending into engagement with the casing whereby said ring is supported.

6. A device of the class described comprising the combination of a casing, a shaft rotatable therein, a hub secured to said shaft, a nut upon said casing provided with a plurality of notches, a packing ring interposed between said hub and nut, and a retaining ring for said packing ring having projections disposed within said notches.

7. A device of the class described comprising the combination of a casing, a shaft rotatable therein, a hub secured to said shaft, a nut upon said casing provided with a plurality of notches, a packing ring interposed between said hub and nut and a supporting ring within which said packing ring is mounted, said supporting ring having lateral projections extended into said notches.

8. A device of the class described comprising the combination of a casing, a shaft rotatable therein, a hub secured to said shaft, a bearing upon said casing for said hub, a retaining member for said bearing, and packing interposed between said retaining member and said hub.

9. A device of the class described comprising the combination of a casing, a shaft rotatable therein, a hub secured to said shaft, a bearing between said hub and casing, a retaining member for said bearing, packing interposed between said retaining member and hub and a retaining ring for said packing carried by said retaining member.

10. A device of the class described comprising the combination of a casing, a shaft rotatable therein, a hub secured to said shaft, a bearing between said hub and casing, a retaining member for said bearing, packing rings interposed between said retaining member and said hub, a metal washer between said packing rings and a member carried by said retaining member adapted to support said packing rings and said washer.

11. As an article of manufacture, a retaining ring for packing withiin which the packing is adapted to be inserted, said ring having a plurality of spaced lugs extending outwardly from one end thereof and adapted to be held by a support placed end to end with the ring.

12. As an article of manufacture, a retaining ring for packing within which the packing is adapted to be inserted, said retaining ring having inwardly extending radial lugs for engaging one side of the packing and axially extending lugs adapted to engage a member forming a support for the ring.

In testimony whereof, I affix my signature.

GRANT W. ROLLINS.